April 30, 1963  A. O. McCOLLUM  3,087,508
RECYCLING POPPET VALVE
Filed Dec. 27, 1960

INVENTOR.
ANDREW O. McCOLLUM
BY
Barthel & Bugbee
ATTORNEYS

# United States Patent Office 3,087,508
Patented Apr. 30, 1963

3,087,508
RECYCLING POPPET VALVE
Andrew O. McCollum, Novi, Mich., assignor to Novi Tool & Machine Co., Novi, Mich., a corporation of Michigan
Filed Dec. 27, 1960, Ser. No. 78,648
12 Claims. (Cl. 137—466)

This invention relates to valves and, in particular, to poppet valves.

One object of this invention is to provide a recycling poppet valve particularly useful in compressed air circuits and having a movable valve plunger which, when shifted in one direction, will remain open until all of the compressed air has been released from one part of the circuit, whereupon the valve plunger shifts to its closed position ready for recycling.

Another object is to provide a recycling poppet valve of the foregoing character wherein the valve plunger is actuated by a reciprocable operating button through the intermediate action of a tilting and reciprocating latch pin which moves the valve plunger forward, unseating the valve, which in turn lets the compressed air pass through a cross passageway and central passageway of the valve plunger into a valve-operating chamber where the air pressure holds the valve plunger in its open position until all static compressed air has been exhausted by way of these passageways through one or more ports in the valve casing, the latch pin meanwhile moving into alignment with the central valve plunger passageway so as to permit the valve plunger to move to its closed position as soon as all static compressed air has been exhausted.

Another object is to provide a recycling poppet valve of the foregoing character which is useful in compressed air circuits operating four-way air-operated bleeder type air valves and finds valuable use in machinery automation installations, where rapid and efficient action is a primary requirement.

Another object is to provide a recycling poppet valve of the foregoing character, the valve plunger of which, when pushed open by the operating button, will remain open until all of the air has been exhausted from that part of the circuit, whereupon it closes, even though the operating button remains held in a depressed condition.

Other objects and advantages of the invention will become apparent during the course of the following description of the accompanying drawings, wherein.

Figure 2:
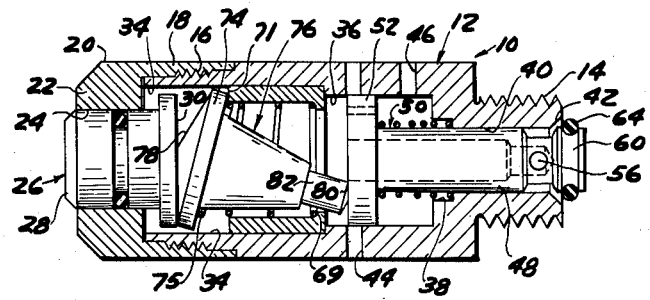
FIGURE 2 is a view similar to FIGURE 1 but showing the positions of the parts after the operating button has been partially depressed to exhaust static compressed air from a part of the circuit.
Figure 3:
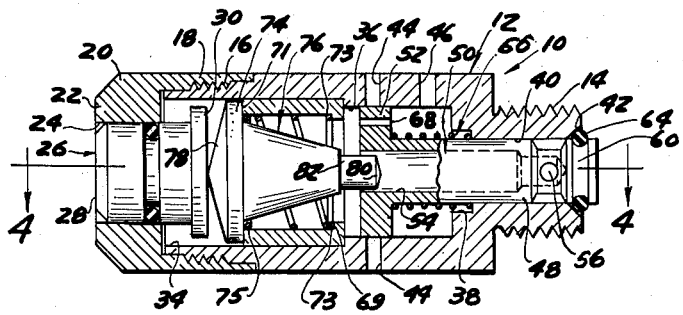
Figure 4:
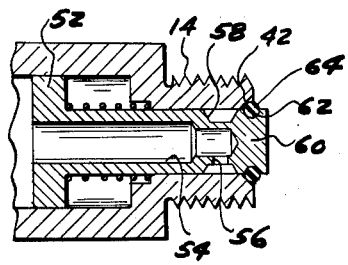

FIGURE 3 is a view similar to FIGURES 1 and 2 but showing the positions of the parts at a later stage of operation wherein the compressed air has been fully exhausted from that part of the circuit and the latch pin has tilted into coaxiality with the valve plunger so as to enter the central bore in the valve plunger and permit the valve plunger to shift to its closed position; and FIGURE 4 is a fragmentary central longitudinal horizontal section through the recycling poppet valve of FIGURES 1, 2 and 3 taken along the line 4—4 in FIGURE 3.

Hitherto, poppet valves have been provided for exhausting air from parts of compressed air circuits, particularly for causing other machine elements to operate alternately in timed relationship. In prior poppet valves of this type, however, the valve plunger shifts to its closed position before releasing all of the air from that part of the circuit from which it is intended to be completely released, such as, for example, from a long pipe or hose, with the result that the compressed air remaining in that part of the circuit from which it was intended to be released, prevented shifting of the valve plunger in the opposite direction. In the recycling poppet valve provided by the present invention, however, the valve plunger remains in its open position until all of the compressed air has been released from that part of the circuit, whereupon it shifts to its closed position, even though the operating button which initially shifted the valve plunger to its open position remains depressed.

Referring to the drawing in detail, FIGURES 1 to 4 inclusive show a recycling poppet valve, generally designated 10, according to one form of the invention as including a tubular valve casing 12 having a reduced diameter threaded portion 14 for insertion in a correspondingly threaded bore or coupling (not shown) by which it is connected to the part of the compressed air circuit from which the compressed air is to be periodically released or exhausted. At its opposite ends, the valve casing 12 is provided with a larger diameter threaded portion 16 on which is threaded the internally-threaded skirt 18 of a cup-shaped valve casing head or cap 20 having an end wall 22 containing an axial bore 24 in which an operating button or valve plunger-shifting element 26 is reciprocably mounted. The operating button 26 is engaged by external means (not shown), such as by a cam, to shift it in timed relationship with the remainder of the machine installation and compressed air circuit.

The operating button 26 intermediate its opposite ends 28 and 30 is annularly grooved to receive an O-ring 32 which facilitates sealing. The inner end 30 of the operating button 26 is flanged for retention within the outer bore 34 of the casing 12, the inner bore or valve chamber 36 of which is of slightly smaller diameter than the outer bore 34 and forms a continuation thereof. The inner bore 36 in turn is provided at its inner end with a reduced diameter annular recess 38 which in turn opens into an inner end bore 40 located within the threaded portion 14 and terminating in a beveled inlet valve seat or port 42. The casing 12 is provided with radial air outlet ports 44 located near the junction of the inner bore 36 with the outer bore 34, and also has a vent port 46 located near the junction of the inner bore 36 with the annular recess 38.

Figure 1:
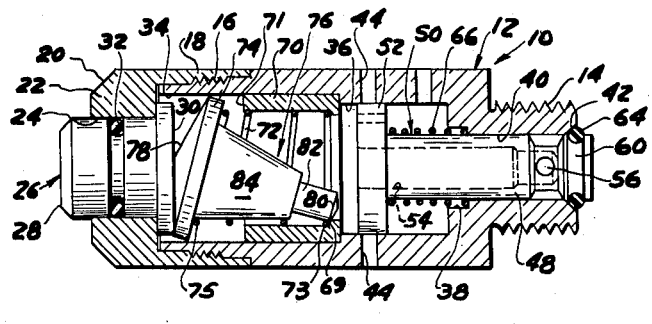
FIGURE 1 is a central longitudinal vertical section through a recycling poppet valve, according to one form of the invention, with the valve plunger in its closed position prior to depression of the operating button.

Reciprocably mounted in the end bore 40 is the elongated hollow stem 48 of a valve plunger, generally designated 50, having a head 52 thereon adapted to close the ports 44 in the closed position of the valve 10 (FIGURES 1 and 3). The valve plunger 50 has a central bore 54 therein (FIGURE 4) leading by way of a radial port 56 from the inner end of the head 52 to an annular groove 58 surrounding the stem 48 immediately adjacent its closed or solid outer end 60. The valve stem end 60 is annularly grooved as at 62 to receive an O-ring 64 of elastic deformable material, such as natural or synthetic rubber for sealing engagement with the conical or beveled valve seat 42 in the closed position of the valve 10. A helical compression spring 66 having its opposite ends seated in the annular recess 38 and against the valve plunger head 52 respectively, urges the head 52 normally into closing relationship with the ports 44. The head 52 also contains a vent port 68 (FIGURE 3) disposed with its axis parallel to the valve plunger bore 54 and of restricted diameter so as to establish limited communication between the inner end of the valve casing bore 36 and the casing vent bore 46.

Mounted in the outer valve casing bore 34 adjacent its junction with the inner casing bore 36 and engaging the annular shoulder therebetween is an internally-flanged latch pin fulcrum sleeve or bushing 70 with an outer fulcrum end abutment surface 71. Within the sleeve 70 is mounted a helical compression cant spring 72. The inner convolution 73 of the cant spring 72 is seated against the internally-flanged inner end 69 of the sleeve 70, whereas the outer convolution 75 is inclined relatively to its axis so as to engage the shouldered or enlarged head 74 of a latch pin, generally designated 76, and normally tilt it as shown in FIGURES 1 and 2. The outer and inner ends 78 and 80 of the latch pin 76 are conical so as to engage the heads 30 and 52 of the operating button 26 and valve plunger 50 when the latch pin 76 is in the tilted position shown in FIGURES 1 and 2. Intermediate the head 74 of the latch pin 76 and the reduced diameter inner end portion 82 having the conical end 80, the latch pin 76 is provided with a frusto-conical portion 84. The reduced diameter inner end portion 82 of the latch pin 76 is of sufficiently smaller diameter than the valve plunger bore 54 (FIGURE 3) to enter the latter and leave an annular clearance space therebetween.

In the operation of the invention, let it be assumed that the recycling poppet valve 10 is connected in a compressed air circuit wherein the threaded reduced diameter casing portion 14 is connected to a pressurized compressed air conduit, reservoir, chamber or the like from which it is desired to release the air in predetermined timed relationship. Let it also be assumed that the end 28 of the operating button 26 is placed in a suitable position where it can be operated manually or by a cam or other machine element to push it inwardly to the right, as shown in FIGURES 2 and 3. Let it further be assumed that the parts of the valve 10 are in the positions of rest shown in FIGURE 1 with the operating button 26 in its outermost position with its enlarged inner end 30 abutting the end wall 22 of the casing cap or head 20. Under these circumstances, the inclined outer end convolution 75 of the cant spring 72 engages the latch pin head 74 and forces its conical outer end surface 78 against the operating button head 30 so as to tilt the axis of the latch pin 76 relatively to the axis of the casing 12 and valve plunger 50 and force the reduced diameter portion 82 laterally off center as the latch pin head 74 pivots on the apex of its conical outer end surface 78 against the end 30 of the operating button 26 (FIGURE 1). Meanwhile, the valve plunger spring 66 has urged the valve plunger 50 to the left so that the O-ring 64 moves into sealing engagement with the valve seat 42 and prevents escape of compressed air from the reservoir (not shown) or other space to the right of the plunger stem end 60, while at the same time the valve plunger head 52 seals off the air discharge ports 44.

When the operating button 26 is now shifted by being pushed inward into the position shown in FIGURE 2, such as by the action of an operator or by a timing device such as a cam, the latch pin 76 is pushed to the right until its conical inner end 80 moves to the right into engagement with the head 52 of the valve plunger 50, moving it to the right into the position shown in FIGURE 2. This action compresses the valve plunger spring 66 and at the same time moves the valve plunger stem end 60 to the right, disengaging the O-ring 64 from the valve seat 42 and thereby opening communication between the valve bore 36 and the valve seat 42 by way of the transverse port 56 and longitudinal bore 54 within the valve plunger 50. At the same time, this action moves the valve plunger head 52 slightly past the mouths of the ports 44, uncovering these ports and permitting air to escape through them.

Meanwhile, the air pressure thus escaping into the casing bore 36 acts against the inner sides of the valve plunger head 52 to shift it still further to the right of the position shown in FIGURE 2, while at the same time the operating button 26 is pushed further inward to the right, pushing upon the latch pin head 74 which meanwhile has engaged the bushing end 71 as a fulcrum. This action tilts the latch pin head 74 around the annular surface 71 as a fulcrum, so that the conical end surface 80 of the latch pin 76 slides over the end surface of the valve plunger head 52 into alignment with the mouth of the valve plunger bore 54. Meanwhile, as the air pressure drops in the reservoir, hose or other space containing compressed air to which the threaded casing portion 14 is connected, the air pressure within the inner end of the casing bore 36 is no longer sufficient to overcome the thrust of the valve plunger spring 66, which thereupon moves the valve plunger 50 to the left or inward, causing the head 52 thereof to close the ports 44. As this occurs, the valve plunger bore 54 moves over the reduced diameter end 82 of the latch pin 76 (FIGURE 3) and the O-ring 64 on the valve stem end 60 moves into sealing engagement with the valve seat 42, closing all communication with the now exhausted air space to the right of the threaded casing portion 14. Any air presure remaining within the casing bores 34 and 36 to the left of the valve plunger head 52 escapes through the vent ports 68 and 46 to the atmosphere, as these ports are constantly open to the atmosphere regardless of the position of the valve plunger 50.

As a result of the foregoing action, the instant the operating button 26 is released by the operator or other actuating means, such as a cam (not shown), the cant spring 72 forces it outward to the left back into the position of FIGURE 1 through the intermediate connection with the latch pin 76. At the same time, however, the normally-tilted end convolution 75 of the cant spring 72 rocks the latch pin 76 from the position shown in FIGURE 3 to that of FIGURE 1 around the apex of the conical end surface 78 as a fulcrum. The parts have now reached the relative positions shown in FIGURE 1, there is no air pressure remaining in the chamber to the right of the threaded casing portion 14, and hence the valve 10 is ready for reactuation without any opposition to the motion of the valve plunger 50 other than that offered by the valve plunger spring 66.

The action, according to the present invention, of completely discharging the static compressed air from the reservoir space to the right of the threaded connection 14 is of great importance when a pair of the recycling poppet valves 10 is used to control the shifting of a four-way bleeder type control valve having an alternately movable piston valve member actuated by piston areas on its opposite ends within end chambers of the control valve casing. The two recycling poppet valves 10 of the present invention are connected by suitable hoses to the four-way valve end chambers for alternate actuation by cams, stops or other suitable means. Each recycling poppet valve 10 operates freely because of the substantially complete discharge of static compressed air effected by its opposite recycling poppet valve 10 because no air pressure remains in the hose or end chamber previously intended to be exhausted, which air pressure, if not exhausted, as in prior poppet valves for this purpose, offers resistance to block the proper operation of the poppet valve 10 intended to be next operated.

The vent port 68 through the valve plunger head 52 equalizes any imbalance of air pressure on opposite sides thereof, and the vent port 46 maintains atmospheric pressure in the right hand end of the bore 36 to the right of the valve plunger head 52.

What I claim is:

1. A recycling poppet valve comprising
   a valve casing having therein a valve chamber and spaced fluid inlet and outlet ports communicable therewith,
   a valve plunger slidably mounted in said chamber and having inlet and outlet valving portions movable respectively into opening and closing relationship with said inlet and outlet ports,
   a plunger-shifting element movably mounted in said casing in spaced relationship with said plunger,
   a latch member movably mounted in said casing between said plunger-shifting element and said plunger in longitudinal motion-transmitting relationship therewith, said latch member being movable longitudinally sufficiently to shift said plunger longitudinally into port-opening relationship with said fluid inlet and outlet ports in response to a predetermined movement of said plunger-shifting element, said latch member also being movable laterally outward and inward relatively to said plunger between an outer plunger-latching position preventing port-closing shifting of said plunger and an inner unlatching position permitting such shifting, said valve plunger having an opening therein receiving a portion of said latch member in unlatching relationship therewith in said inner unlatching position of said latch member, yielding means normally urging said plunger longitudinally toward its port-closing position, yielding means normally urging said latch member laterally outward toward its outer plunger-latching position, means responsive to the longitudinal movement of said latch member for shifting said latch member laterally inward from said outer plunger-latching position to said inner plunger-unlatching position with said latch member portion alignedly positioned with said plunger opening to enter said opening, and means responsive to the attainment of a predetermined pressure in said chamber for urging said plunger toward its port-opening position.

2. A recycling poppet valve, according to claim 1, wherein said pressure-responsive means includes a piston portion on said valve plunger within said chamber.

3. A recycling poppet valve, according to claim 2, wherein said valve plunger has a fluid passageway therethrough from said inlet valving portion to said piston portion.

4. A recycling poppet valve, according to claim 3, wherein said opening in said plunger constitutes the inner end of said fluid passageway loosely receiving said portion of said latch member upon swinging of said latch member from its outer latching position toward its inner unlatching position.

5. A recycling poppet valve, according to claim 4, wherein said latch-member-urging yieldingly means includes a coil spring having an obliquely-disposed end convolution engaging and tilting said latch member laterally outward toward its plunger-latching position.

6. A recycling poppet valve, according to claim 2, wherein said casing has a constantly open vent aperture therein and wherein said piston portion has a constantly open restricted passageway therethrough maintaining restricted-flow constant communication with said vent aperture.

7. A recycling poppet valve, according to claim 1, wherein said plunger-urging yielding means includes a first resilient element engaging and urging said plunger toward its port-closing position.

8. A recycling poppet valve, according to claim 7, wherein said latch-member-urging yielding means includes a second resilient element engaging and urging said latch member laterally outward toward its plunger-latching position.

9. A recycling poppet valve, according to claim 8, wherein said latch member shifting means also includes a fulcrum element connected to said casing and pivotally engageable by said latch member.

10. A recycling poppet valve, according to claim 9, wherein said latch member has a contact surface thereon inclined obliquely to the axis of said latch member and engageable by said plunger-shifting element and cooperative with said plunger-shifting element and said resilient element to urge said latch member laterally outward toward its outer plunger-latching position.

11. A recycling poppet valve, according to claim 10, wherein said second resilient element comprises a coil spring having an obliquely-disposed end convolution engaging and tilting said latch member laterally outward toward its plunger-latching position around said fulcrum element as a pivot.

12. A recycling poppet valve, according to claim 9, wherein said second resilient element comprises a coil spring having an obliquely-disposed end convolution engaging and tilting said latch member laterally toward its plunger-latching position around said fulcrum element as a pivot.

References Cited in the file of this patent
UNITED STATES PATENTS
2,894,713    Savage et al. _____ July 14, 1959